United States Patent [19]

Loganbill et al.

[11] 4,430,604
[45] Feb. 7, 1984

[54] RECTIFIER SWITCH FOR ELECTRIC LAWN MOWERS

[75] Inventors: Ernest L. Loganbill; William E. Taylor, both of Independence, Kans.

[73] Assignee: Echlin Inc., Branford, Conn.

[21] Appl. No.: 361,143

[22] Filed: Mar. 24, 1982

[51] Int. Cl.³ .............................................. H02P 3/12
[52] U.S. Cl. .................................... 318/379; 56/10.5; 363/126; 363/144
[58] Field of Search ................ 363/13, 126, 144, 141; 56/10.5; 318/376, 379, 380; 361/357

[56] References Cited

U.S. PATENT DOCUMENTS

| | | | |
|---|---|---|---|
| 2,973,467 | 2/1961 | Choudhury et al. | 318/211 |
| 3,348,114 | 10/1967 | Wright et al. | 318/369 |
| 3,501,684 | 3/1970 | Webb | 318/379 |
| 3,714,534 | 1/1973 | Headley | 318/380 |
| 3,786,329 | 1/1974 | Whited | 318/379 |
| 3,800,202 | 3/1974 | Oswald | 318/376 |
| 4,133,413 | 1/1979 | Watanabe | 318/368 |
| 4,306,404 | 12/1981 | Szymanis et al. | 56/10.5 |
| 4,367,523 | 1/1983 | Urba | 363/144 |

Primary Examiner—William H. Beha, Jr.
Attorney, Agent, or Firm—Neuman, Williams, Anderson & Olson

[57] ABSTRACT

A switch is disclosed which includes both a switching assembly and a bridge rectifier, the switch assembly including contacts for connecting a DC motor such as the motor of an electric lawn mower, to AC supply lines or for short-circuiting the motor to rapidly stop rotation of the motor. Diodes of the bridge rectifier have terminals which are directly secured to portions of metal members which also carry contacts of the switch and/or serve as terminals for connection to the motor or the supply lines.

12 Claims, 7 Drawing Figures

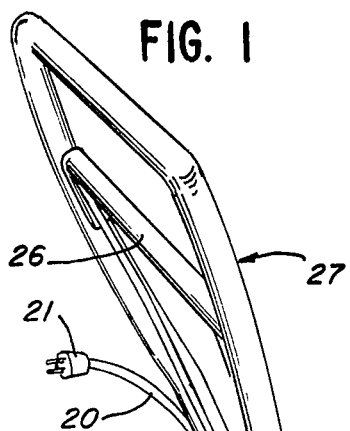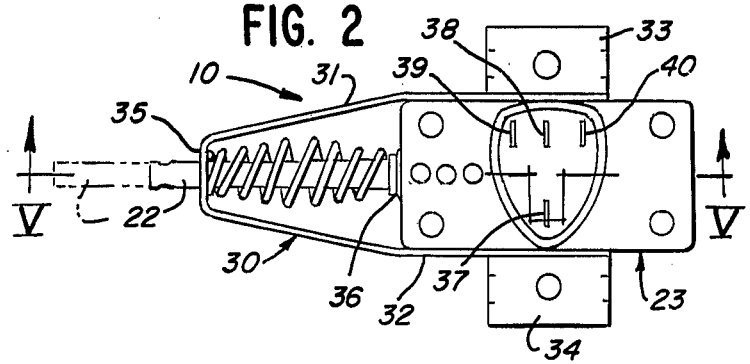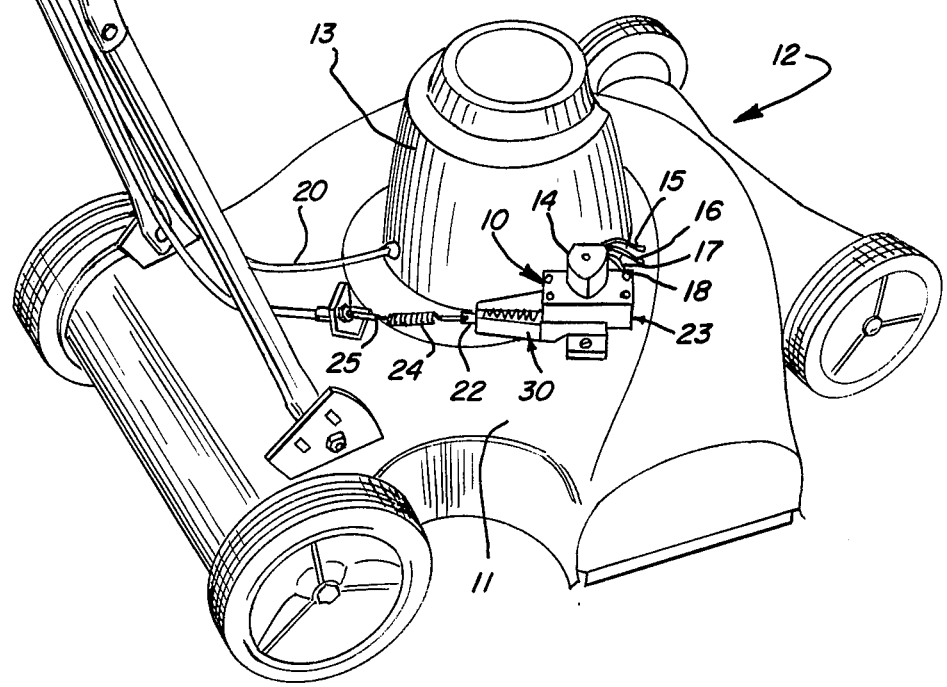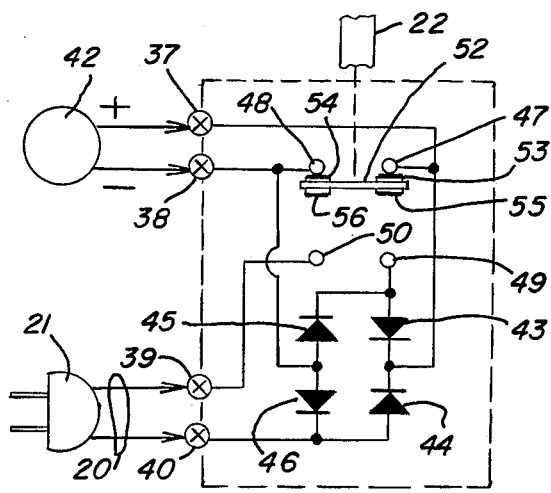
FIG. 1  FIG. 2  FIG. 3

RECTIFIER SWITCH FOR ELECTRIC LAWN MOWERS

This invention relates to a switch and more particularly to a switch for use in electric lawn mowers or the like to connect a DC motor to AC supply lines. The switch is operative in an on condition to supply rectified current to the motor and is operative in an off condition to short-circuit the motor and provide dynamic braking. The switch is relatively simple in construction and operation and yet is rugged and highly reliable. It is also readily and economically manufacturable, using a minimum number of parts which can be easily fabricated and assembled.

BACKGROUND OF THE INVENTION

Arrangements have heretofore been provided for supplying rectified AC current to DC motors of electric lawn mowers or the like and it has also been proposed to short-circuit such motors in order to provide dynamic braking and minimize the likelihood of injury to users of the lawn mower. The arrangements as heretofore proposed have been generally satisfactory when carefully manufactured, assembled, installed and used but have been such that they can be subject to failure when proper care is not exercised in manufacture and installation, or when the user does not observe instructions or subjects the switch to adverse environmental conditions. Also, the arrangements have required interconnection of a number of component assemblies and have been relatively expensive, both with respect to the fabrication of component parts and with respect to the labor involved in assembly and interconnection of the parts.

SUMMARY OF THE INVENTION

This invention was evolved with the general object of avoiding problems with devices as proposed in the prior art and of providing improvements such as to obtain greater safety and reliability while at the same time reducing the cost of manufacture, assembly and installation.

An important aspect of the invention is in the recognition that problems with prior art proposals result from the fact that rectifiers and switch components have been located in separate housings or at spaced points such as to require wiring and connections which increase the likelihood of failures as well as increasing cost and producing other undesirable results. In accordance with the invention, a switch is provided in which both switching contact means and rectifier means are provided in a common housing from which terminals project for connection to AC supply lines and to the DC motor of an electric mower or the like. The switch means are arranged for operating in an on condition to connect the motor through the rectifier means to the AC supply lines and for operating in an off condition to short-circuit the motor. By combining the rectifier and switching components in a common housing, it is possible to minimize the time and expense involved in installation on an electric mower or the like. It is also possible to obtain a number of other important advantages.

One additional advantage is that the terminals of diodes which form the rectifier means may be connected to portions of conductive metal members within the housing in a manner such as to obtain good heat transfer as well as to conduct electric current. Preferably, terminals of the diodes are welded or otherwise directly secured to portions of the metal members within the housing. The metal members may also have portions projecting from the housing to form the terminals for connection to the motor and for connection to one or both of the AC supply lines.

Additional features of the invention relate to the configuration and interrelationship of conductive metal members, diodes, contact elements and other components in a manner such as to obtain a switch which is highly reliable in operation while being readily and economically manufacturable.

With a preferred type of construction according to the invention, a switch is provided in which electrical connections are obtained with only six conductive metal members, one being a movable member operable as a bridging member, and the remaining five members functioning as external terminals, as contact supports and/or to directly connect to terminals of the diodes, two of the five members being operative to perform all three functions.

The bridging member is disposed between a pair of springs on a portion of an actuating member inside the housing, the springs being operative to resiliently engage contacts on the bridging member with fixed contacts in the on and off conditions of the switch. In addition, a spring is provided on the outside of the housing, acting to insure movement of the actuating member to the off condition when the actuating member is released.

These and other objects, features and advantages will become more fully apparent from the following detailed description taken in conjunction with the accompanying drawings.

BRIEF DESCRIPTION OF THE DRAWINGS

FIG. 1 is a perspective view showing a rectifier switch constructed in accordance with the invention, the switch being shown mounted on a lawn mower;

FIG. 2 is a top plan view of the rectifier switch;

FIG. 3 is a schematic electrical diagram showing the electrical connection of components of the switch and the connection of the switch to a motor and AC supply lines;

DESCRIPTION OF A PREFERRED EMBODIMENT

Figure 4:
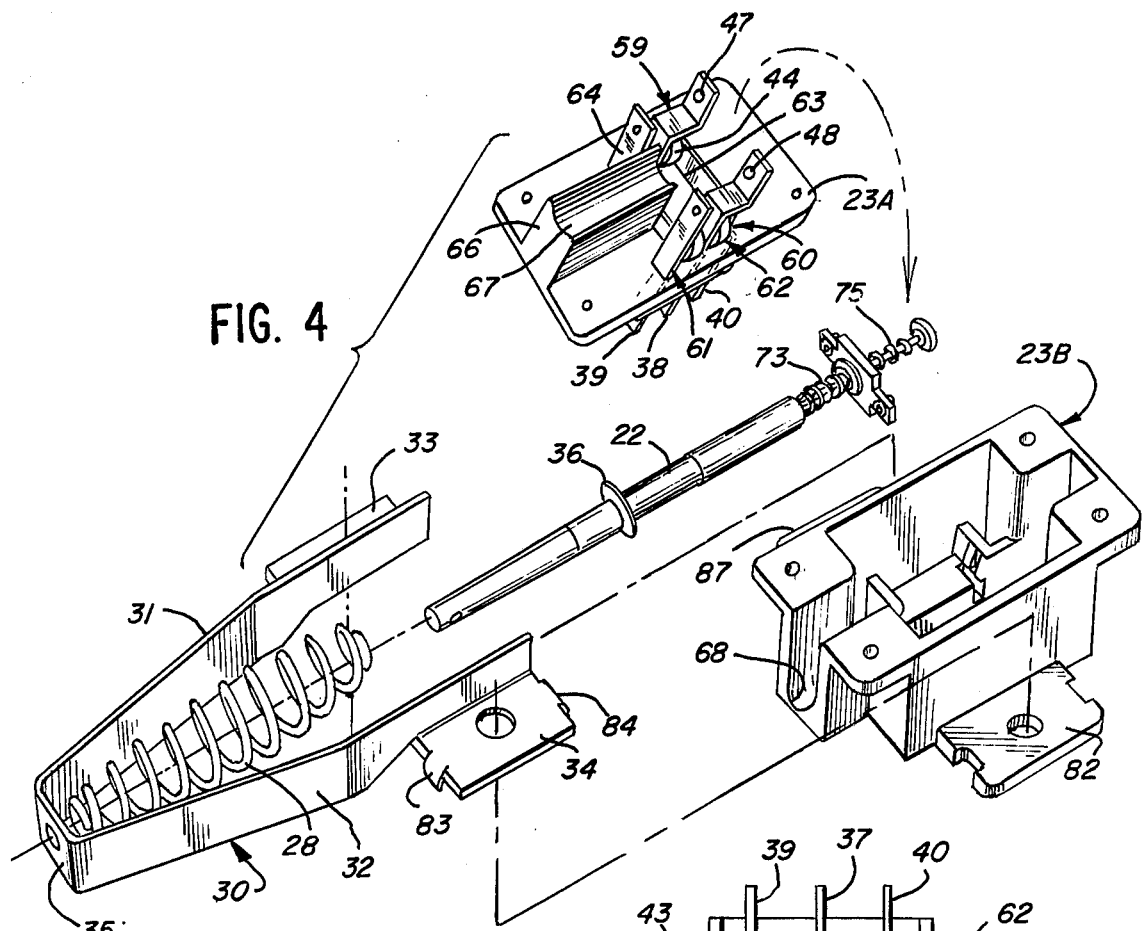
FIG. 4 is a perspective view showing component parts and sub-assemblies of the switch in disassembled form, to show the construction thereof.

Reference numeral 10 generally designates a rectifier switch constructed in accordance with the principles of this invention, shown mounted on a housing 11 of an electric lawn mower 12 adjacent an upstanding housing portion 13 which encloses an electric drive motor of the mower 12. Electrical connections to the switch 10 are obtained through a connector 14 which is arranged to receive projecting prong terminals of the switch 10 and which has four wires 15, 16, 17 and 18 extending there-from. The wires 15-18 extend into the motor housing 13, wires 15 and 16 being connected to terminals of the motor within the housing 13 and wires 17 and 18 being connected to the conductors of a supply line 20 which is extended through an opening in the housing 13. A plug 21 is provided at the end of the line 20 for connection to the end of a long line cord used to supply AC current to the mower 12.

The switch 10 includes an elongated actuating member 22, a portion of which projects from a housing 23 of the switch. The end of the actuating member 22 has an opening which receives a hook portion of a connector 24 at one end of a cable 25, the opposite end of which is connected to a bail 26 on a handle 27 of the mower 12.

In operation, when the user operates the bail 26, the actuating member 22 is pulled outwardly, against the force of a spring 28, to operate the switch to an on condition and to supply rectified current to the motor of the lawn mower 12. When the bail 26 is released, the spring 28 moves the actuating member 22 to an off position in which the motor of the lawn mower is short-circuited, to thereby obtain dynamic braking and to rapidly stop the motor. It is understood that other types of switch operating mechanisms may be used.

FIG. 2 is a top plan view of the switch 10. A generally U-shaped mounting bracket 30 is provided having legs 31 and 32 which embrace the housing 23 and which have out-turned flange portions 33 and 34 provided with openings through which mounting bolts extend. The spring 28 is disposed around the actuating member 22 and acts between a bight portion 35 of the bracket 30 and a washer 36 which engages a shoulder on the actuating member 22.

Four prongs 37, 38, 39 and 40 project upwardly from the switch housing 23 for insertion into the plug 14. As shown diagrammatically in FIG. 3, the terminals formed by prongs 37 and 38 are connected to a motor 42 of the mower 12 which may preferably be a permanent magnet motor. The terminals formed by prongs 39 and 40 are connected to the plug 21.

Important features of the invention relate to the provision within the housing 23 of a rectifier which is preferably a bridge rectifier formed by four diodes 43, 44, 45 and 46. In addition, a switch assembly is provided which includes a first pair of fixed contacts 47 and 48 connected to the prongs 37 and 38 and a second pair of fixed contacts 49 and 50, contact 49 being connected to the anode of diode 43 and the cathode of diode 45 and contact 50 being connected to the prong 39. Prong 40 is connected to the anode of diode 44 and to the cathode of diode 46, prong 37 is connected to the cathodes of diodes 43 and 44 and prong 38 is connected to the anodes of diodes 45 and 46.

The switch assembly further includes a member 52 of conductive material which is operated by the actuating member 22 and which has contacts 53 and 54 on one side thereof engageable with the contacts 47 and 48 in the off condition of the switch to short-circuit the motor and another pair of contacts 55 and 56 on the opposite side thereof engageable with the contacts 49 and 50 to supply AC current to the bridge rectifier in the on condition of the switch.

The internal construction and other features of the switch are illustrated in FIGS. 4-7. The housing 23 which is of an insulating material, preferably a suitable plastic, is formed by top and bottom parts 23A and 23B which may be secured together by rivets during assembly. The top part 23A carries four members 59, 60, 61 and 62 of conductive metal which have ends projecting upwardly from the top part 23A to form the prongs 37-40. Diodes 44 and 46 are secured directly between portions of the members 59 and 60 and a portion 63 of the member 62 which extends at right angles to the prong portion 40.

An additional member 64 of conductive metal is provided which is L-shaped, the contact 49 being secured to one leg thereof. The diodes 43 and 45 are secured directly between the other leg of the member 64 and portions of the members 59 and 60. In assembly, the connections may preferably be made by soldering terminals on the opposite sides of the diodes directly to the respective members of conductive material, each diode being preferably in the form of a button as illustrated.

Figure 6:
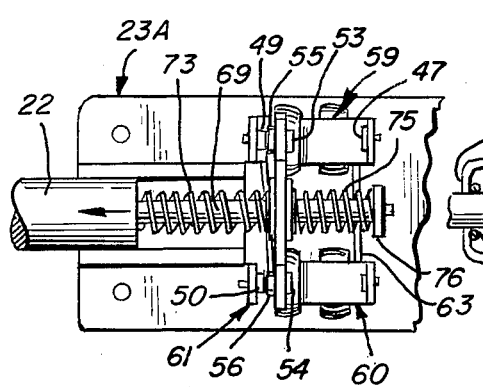
FIG. 6 is a view looking upwardly at a movable contact-carrying member and associated fixed components, showing the cooperation thereof in an on condition of the switch.
Figure 7:
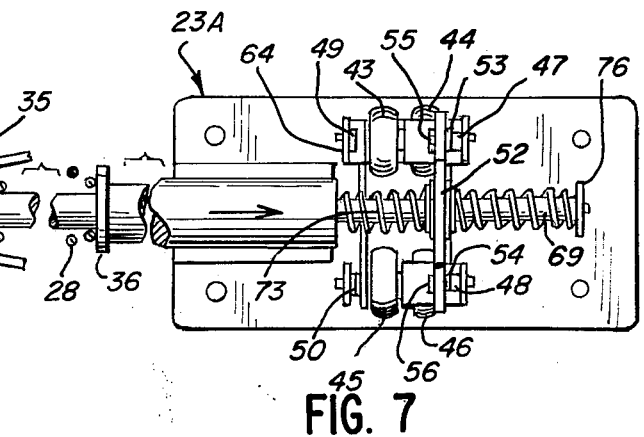
FIG. 7 is a view similar to FIG. 6 but showing the cooperation of the parts in an off condition of the switch.

The top housing part 23A has a downwardly projecting portion 66 which is formed with a cylindrical recess 67 at its lower end to cooperate with a surface 68 of the lower housing part 23B in forming a guide for the actuating member 22. The switch member 52 is supported on a reduced diameter portion 69 of the actuating member 22 by means of a grommet 70 of insulating material which is sandwiched between two washers 71 and 72. A spring 73 extends between the washer 71 and a shoulder 74 on the actuating member 22 while a spring 75 extends between the washer 72 and a washer 76 affixed on the end of the reduced diameter portion 69 of the actuating member 22. In the on position of the actuating member 22 as illustrated in FIG. 6, the spring 75 is compressed, resiliently engaging the contacts 55 and 56 with the contacts 49 and 50. In the off position as illustrated in FIG. 7, the spring 73 is compressed, resiliently engaging the contacts 53 and 54 with the contacts 47 and 48.

Figure 5:
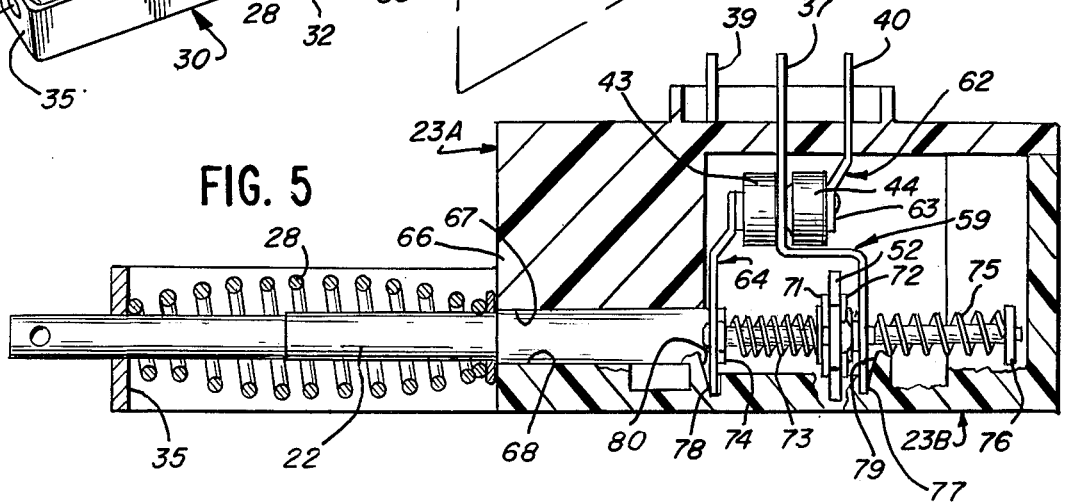
FIG. 5 is a sectional view, on an enlarged scale, taken substantially along line V—V of FIG. 2.

It is noted that recesses or sockets are provided in the lower housing part 23B for receiving the lower terminal ends of the members 59, 60, 61 and 64 to provide support at points closely adjacent the contacts 47-50. The recesses or sockets for the members 59 and 64 are shown in FIG. 5 and are indicated by reference numerals 77 and 78, inclined surfaces 79 and 80 being positioned adjacent the sockets 77 and 78 to facilitate entry of the ends of members 59 and 64. It will be understood that similar recesses and surfaces are provided for the other two contact-carrying members 60 and 61.

In assembly, the actuating member 22 may be assembled with the springs 73 and 75 and associated parts on the actuating member 22 in the manner as shown in FIG. 4. Then the assembly is positioned in the lower housing part 23B. The upper housing part 23A with the conductive metal members and diodes assembled and connected together thereon is then installed on the lower housing part 23B and secured thereto by suitable rivets. Then the washer 36 and spring 28 are placed on the actuating member 22, and the bracket 30 is positioned with the bight portion 35 engaging spring 28 and with the flange portions 33 and 34 positioned over projecting flange portions 81 and 82 of the lower housing part 23B. Tabs 83 and 84 on the flange 34 may then be turned inwardly under the flange 82 and similar tabs on the flange 33 may be turned inwardly under the flange 81 to lock the parts together.

It is noted that the spring 28 is optional and need not be used in cases in which the actuating means for the switch is such as to insure movement of the actuating member 22 to its off position upon release of the actuating control.

It will be appreciated that the rectifier switch of the invention can be readily and economically manufactured and readily installed. Since no separate rectifier unit is required, the number of required connecting wires and connector devices is minimized. The installation is quite simple and with the simplicity and other features of construction and operation of the device as shown and described and with there being a minimum number of component parts, the likelihood of malfunction is minimized.

It will be understood that modifications and variations may be effected without departing from the spirit and scope of the novel concepts of this invention.

We claim:

1. A switch for energization of a DC motor of an electric mower or the like from AC supply lines, comprising: a switch housing, terminals accessible from the outside of said housing for connection to said motor and to said AC supply lines, contact means within said housing, an actuating member mechanically connected to said contact means and having a portion projecting from said housing for actuation of said contact means between an off condition and an on condition, rectifier means within said housing, and connection means within said housing connecting said contact means and said rectifier means and said terminals for connecting said motor through said rectifier means to said AC supply lines in said on condition of said contact means and for short circuiting said motor in said off condition of said contact means.

2. In a switch as defined in claim 1, a plurality of conductive metal members, portions of certain of said members being accessible from the outside of said housing to form said terminals, said rectifier means comprising a plurality of diodes having terminals connected to portions of said conductive metal members within said housing.

3. In a switch as defined in claim 2, said terminals of said diodes being directly secured to said portions of said conductive metal members within said housing.

4. In a switch as defined in claim 1, a plurality of conductive metal members including fixed members having portions accessible from the outside of said housing to form said terminals and a movable member mechanically connected to said actuating member, said contact means including fixed contacts mounted directly on portions of said fixed members within said housing and contacts on said movable member for engagement with one pair of said fixed contacts in said on condition of said contact means and for engagement with another pair of said fixed contacts in said off condition of said contact means.

5. In a switch as defined in claim 4, said rectifier means comprising a plurality of diodes having terminals connected to portions of said fixed members within said housing.

6. In a switch as defined in claim 4, said terminals of said diodes being directly secured to said portions of said fixed members within said housing.

7. In a switch as defined in claim 4, a first one of said metal members being a fixed member forming one motor terminal and carrying a first one of said fixed contacts, a second one of said metal members being a fixed member forming a second motor terminal and carrying a second one of said fixed contacts, a third one of said metal members being a fixed member forming one line terminal and carrying a third one of said fixed contacts, a fourth one of said metal members being a fixed member carrying a fourth one of said contacts, and a fifth one of said metal members being a fixed member forming a second line terminal.

8. In a switch as defined in claim 7, said rectifier means comprising a first diode connected between said first and fourth ones of said metal members, a second diode connected between said first and fifth ones of said metal members, a third diode connected between said second and fourth ones of said metal members, and a fourth diode connected between said second and fifth ones of said metal members.

9. In a switch as defined in claim 8, said diodes having terminals directly secured to said fixed members within said housing.

10. In a switch as defined in claim 4, said contacts on said movable member including a first pair of contacts on one side of said movable member for engagement with said one pair of said fixed contacts in said on condition of said contact means and a second pair of contacts on an opposite side of said movable member for engagement with said another pair of said fixed contacts in said off condition of said contact means, said movable member being movable in one direction to said on condition and in an opposite direction to said off condition.

11. In a switch as defined in claim 10, a pair of springs acting between said actuating member and said movable member for resiliently engaging said contacts on said movable member with said one pair of fixed contacts in said on condition of said contact means and with said another pair of fixed contacts in said off condition of said contact means.

12. In a switch as defined in claim 10, a spring on the outside of said housing acting between said housing and said actuating member for urging said actuating member in a direction to move said contact means to said off condition.

* * * * *